United States Patent [19]

Herchenroeder et al.

[11] E Re. 29,035

[45] Reissued Nov. 16, 1976

[54] METHODS OF ADDING REACTIVE METALS TO FORM A REMELTING ELECTRODE

[75] Inventors: Robert B. Herchenroeder; Howard Joseph Klein, both of Kokomo, Ind.

[73] Assignee: Cabot Corporation, Kokomo, Ind.

[22] Filed: Nov. 28, 1975

[21] Appl. No.: 636,196

Related U.S. Patent Documents

Reissue of:

[64] Patent No.: 3,910,341
Issued: Oct. 7, 1975
Appl. No.: 482,062
Filed: June 24, 1974

[52] U.S. Cl. ..... 164/59; 164/112
[51] Int. Cl.[2] ..... B22D 27/20
[58] Field of Search ..... 164/57, 58, 59, 98, 164/110, 112

[56] References Cited

UNITED STATES PATENTS

| | | | |
|---|---|---|---|
| 1,166,167 | 12/1915 | Woods | 164/58 |
| 1,180,248 | 4/1916 | De Lapotterie | 164/59 X |
| 1,703,417 | 2/1929 | Donaldson | 164/59 X |

FOREIGN PATENTS OR APPLICATIONS

| | | | |
|---|---|---|---|
| 2,060,309 | 6/1971 | France | 164/57 |
| 2,085,306 | 12/1971 | France | 164/57 |

*Primary Examiner*—Francis S. Husar
*Assistant Examiner*—John E. Roethel
*Attorney, Agent, or Firm*—Jack Schuman; Joseph J. Phillips

[57] ABSTRACT

A method is provided for adding reactive metals to a molten metal bath by forming said reactive metal into an elongated member, suspending said member generally lengthwise vertically of a mold and pouring metal to be treated into said mold, to make said formed member an integral part of the molten metal as it rises in the mold and is cooled.

18 Claims, 2 Drawing Figures

METHODS OF ADDING REACTIVE METALS TO FORM A REMELTING ELECTRODE

Matter enclosed in heavy brackets [ ] appears in the original patent but forms no part of this reissue specification; matter printed in italics indicates the additions made by reissue.

This invention relates to methods of adding reactive metals to molten baths and particularly to a method of adding reactive metals to a molten metal ingot or casting such as an electrode for electroslag remelting (ESR), vacuum arc remelting, plasma arc remelting, electron beam remelting or similar remelting techniques.

The problems which are common to present day methods of adding reactive metals to molten baths are well known and long recognized. It is well known that large proportions of added reactive metals are lost in normal practice by contact with refractory linings, with slag and with air. It is also known that there is frequently a marked difference from one ingot to another in a series of ingots cast from melts to which a reactive metal has been added and that this is particularly true from first to last ingot.

We have found a method of adding reactive metals, such as lanthanum, which eliminates these problems.

Preferably, we provide an elongated member containing the reactive metal extending vertically generally from top to bottom of a mold and proportioned to feed the metal uniformly into the mold as the mold is filled with molten metal to be treated. Preferably, we suspend a tube filled with the reactive metal or an alloy thereof axial of the mold so that as the metal rises in the mold, the tube melts off in the molten metal releasing the reactive metal into the molten mass.

In some instances it may be desirable to encapsulate the reactive metal in the cast electrode as an integral but distinct core so that it is released during subsequent remelting of the electrode rather than during casting of the electrode as just described. In such event, we provide a tube or member e.g. of thick walled construction, such that the member is not distributed into the molten metal but is encapsulated as the metal cools as an elongated core and is then subsequently melted during the remelting operation. Prior to filling the mold with molten alloy we have found it to be good practice to purge the mold with an inert gas such as argon.

Figure 2:
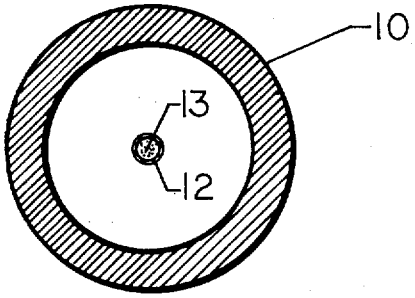
Figure 1:
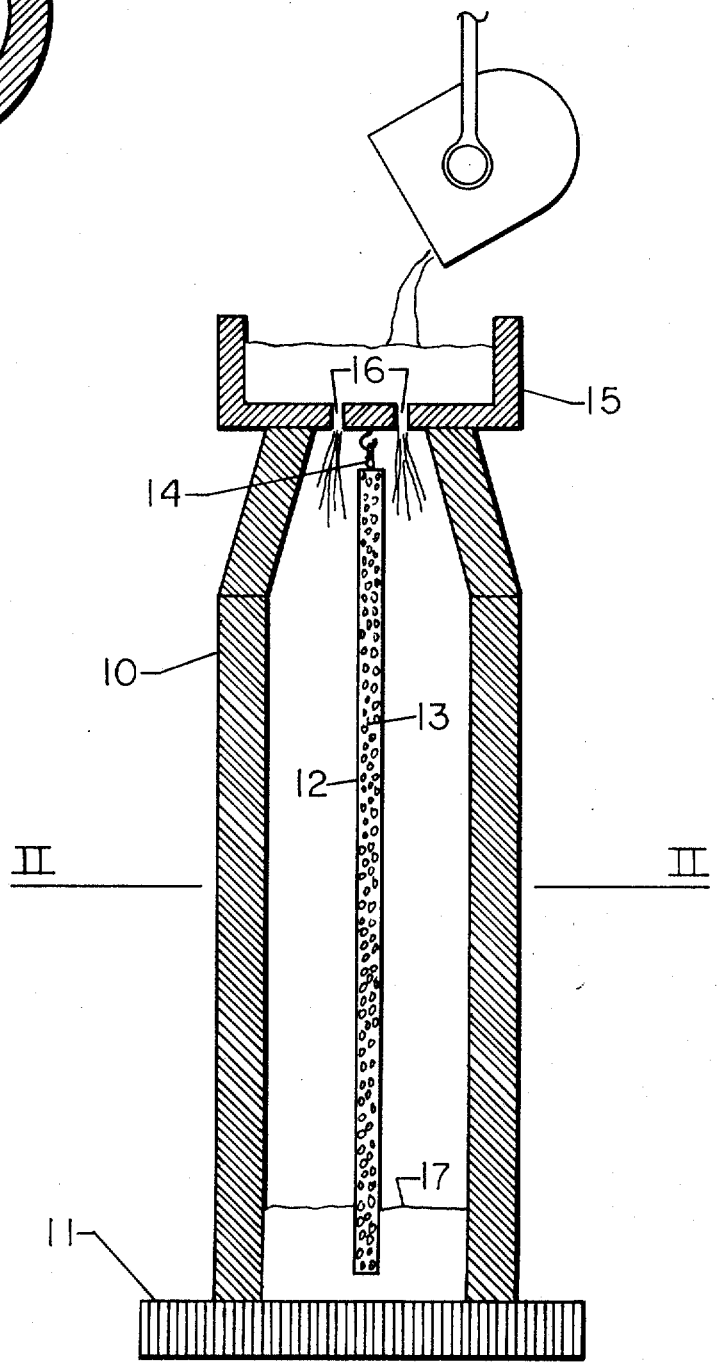

In the foregoing general description, we have outlined certain objects, purposes and advantages of this invention. Other objects, purposes and advantages will be apparent from a consideration of the following description and the accompanying drawings in which:

FIG. 1 is a vertical section through an apparatus for practicing this invention; and FIG. 2 is a section on the line II—II of FIG. 1.

Referring to the drawings, we have illustrated an ESR electrode mold 10 on a stool 11, both of conventional form. A tube 12 filled with LaSi 13 (or other reactive metal or alloy) is suspended by a chain 14 from the bottom of a tundish 15 into which molten metal is poured and delivered through nozzle 16 into mold 10. The mold 10 is purged with inert gas. As the molten metal 17 rises in mold 10, the tube 12 is melted off and the reactive metal is dissolved into the metal.

It is, of course, obvious that the axial member need not be a tube filled with reactive metal but may be an elongated formed member of the reactive metal in a compatible matrix.

The tube 12 may be restricted along its length so as to compartment the reactive metal and prevent its flowing out of the end when the end is melted off as pouring beings. This restriction may be accomplished by pinching, crimping or otherwise constricting or compartmenting the tube at spaced intervals along its length. This restriction will also provide, in effect, successive metered charges of reactive metal as the molten metal to be treated rises in the mold.

Inherent in this invention are a number of advantages not available in present methods. These are: (A) the lanthanum or other reactive metal addition is distributed uniformly from top to bottom of the cast electrode, (B) there is no loss of the reactive metal by reaction with refractories such as those found in ladles, furnaces or tundishes because the molds are not lined with ceramic and solidification at the mold metal interface is almost instantaneous, (C) because slag is not present, with the reactive metal, there is no loss of the addition via slag-addition interaction, (D) reaction of the reactive metal with air is minimal because the addition melts after it is submerged in molten alloy and because the mold represents a near closed system from which air can be purged by argon or other inert gas, (E) because losses due to reactions with air and refractory is minimal the amount of undesirable oxide inclusions in the electrode are minimal, (F) because reactive metal recovery is high, less of it need be added and therefore costs are reduced especially when the more expensive elements such as yttrium or lanthanum are added, (G) because less of the reactive metal need be added, less of the alloying agents such as Fe, Ni, Cr, Si, Al, etc. often commonly associated with reactive elements are added to the system resulting in easier control of these elements.

In the foregoing specification, I have described certain preferred practices of our invention, however, it will be understood that this invention may be otherwise embodied within the scope of the following claims.

We claim:

1. The method of forming a remelting electrode containing reactive metals to be subsequently remelted in one of the known remelt techniques comprising the steps of:

a. forming said reactive metal to be added into an elongated member having a length substantially equal to the length of the remelting electrode;

b. suspending said formed reactive metal in a mold having a height equal to the length of the remelting electrode; and c. pouring the molten metal to be treated around said formed reactive metal in said mold, whereby said reactive metal becomes an integral part of the formed remelting electrode for subsequent remelting.

2. The method as claimed in claim 1 wherein the formed reactive metal is dissolved into the molten metal to be treated as said molten metal is poured into the mold.

3. The method as claimed in claim 1 wherein the molten metal is solidified around the formed reactive metal leaving the reactive metal as an integral core.

4. The method as claimed in claim 1 wherein the formed reactive metal is in the form of a tube filled with an alloy of said reactive metal.

5. The method as claimed in claim 1 wherein the mold is purged with an inert gas prior to filling with molten alloy.

6. The method of claim 5 wherein the inert gas is argon.

7. The method as claimed in claim 1 wherein the reactive metal is lanthanum or an alloy of lanthanum.

8. The method of claim 1 wherein the reactive metal is yttrium or an alloy of yttrium.

9. The method as claimed in claim 1 wherein the reactive metal is formed into an elongated rod in a compatible matrix.

*10. Method of forming a remelting electrode comprising a first metal and reactive metal to be remelted subsequently, said method comprising:*

*a. forming said reactive metal into an elongated member having a length substantially equal to the length of the remelting electrode;*

*b. postioning said formed reactive metal in a mold having a height at least equal to the height of the remelting electrode;*

*c. pouring molten first metal into said mold around said formed reactive metal;*

*d. solidifying said molten first metal in said mold around said formed reactive metal thereby to form said remelting electrode.*

*11. Method as in claim 10 wherein said formed reactive metal is positioned in said mold with its longitudinal axis substantially parallel to the longitudinal axis of the mold.*

*12. Method as in claim 11 wherein the longitudinal axis of the formed reactive metal is substantially coincident with the longitudinal axis of the mold.*

*13. Method as in claim 10 wherein during the performance of step (c), portions of said formed reactive metal are dissolved in said molten first metal.*

*14. Method as in claim 10 wherein after completion of step (d), said reactive metal remains as an integral core of the remelting electrode.*

*15. Method as in claim 10 wherein, in performing step (a), said reactive metal is inserted into a tube.*

*16. Method as in claim 10, further comprising:*

*e. prior to performing step (c), purging said mold with an inert gas.*

*17. Method as in claim 10, wherein the reactive metal is selected from the group consisting of lanthanum, alloys of lanthanum, yttrium and alloys of yttrium.*

*18. Method as in claim 10 wherein, in performing step (a), said reactive metal is combined with a compatible matrix.*

* * * * *